United States Patent
Reziapova et al.

(10) Patent No.: US 12,106,614 B2
(45) Date of Patent: Oct. 1, 2024

(54) SYSTEMS AND METHODS FOR VALIDATING TELEMATICS DEVICE INSTALLATIONS

(71) Applicant: Geotab Inc., Oakville (CA)

(72) Inventors: Elena Reziapova, Port Moody (CA); Gregory Foley, San Marcos, CA (US)

(73) Assignee: Geotab Inc., Oakville (CA)

( * ) Notice: Subject to any disclaimer, the term of this patent is extended or adjusted under 35 U.S.C. 154(b) by 280 days.

(21) Appl. No.: 17/899,068

(22) Filed: Aug. 30, 2022

(65) Prior Publication Data

US 2023/0230426 A1 Jul. 20, 2023

Related U.S. Application Data

(63) Continuation of application No. 17/588,710, filed on Jan. 31, 2022, now Pat. No. 11,468,717.

(60) Provisional application No. 63/300,137, filed on Jan. 17, 2022.

(51) Int. Cl.
*G07C 5/08* (2006.01)
*G07C 5/00* (2006.01)
*G06Q 10/0631* (2023.01)
*G08G 1/00* (2006.01)

(52) U.S. Cl.
CPC .......... *G07C 5/0808* (2013.01); *G07C 5/008* (2013.01); *G06Q 10/06311* (2013.01); *G08G 1/205* (2013.01)

(58) Field of Classification Search
CPC ................. G07C 5/0808; G07C 5/008; G06Q 10/06311; G08G 1/205
See application file for complete search history.

(56) References Cited

U.S. PATENT DOCUMENTS

| | | | |
|---|---|---|---|
| 6,507,786 B2 | 1/2003 | Flick | |
| 6,703,946 B2 | 3/2004 | Flick | |
| 6,809,659 B2 | 10/2004 | Flick et al. | |
| 10,040,349 B2* | 8/2018 | DeVries | B60K 28/063 |
| 10,430,883 B1* | 10/2019 | Bischoff | G06Q 40/04 |
| 11,675,042 B1 | 6/2023 | Lloyd et al. | |

(Continued)

OTHER PUBLICATIONS

Extended European Search Report for European Application No. 23150983.7, mailed Jun. 19, 2023, 14 Pages.

*Primary Examiner* — Michael V Kerrigan
(74) *Attorney, Agent, or Firm* — Lawrence Xin-Tao Yu

(57) ABSTRACT

Systems and methods for validating telematics device installations are provided. The systems and methods involve operating at least one processor to: receive, from an installer, a device identifier corresponding to a telematics device; determine whether telematics data was received from the telematics device based at least on the device identifier; in response to determining that telematics data was received from the telematics device: present an indication to the installer that the telematics device was correctly installed in the vehicle; receive, from the installer, vehicle information associated with the vehicle; and store the vehicle information in association with the device identifier; and in response to determining that telematics data was not received from the telematics device: present an indication to the installer that the telematics device was not correctly installed in the vehicle; and store installation information in association with the device identifier.

20 Claims, 15 Drawing Sheets

(56) References Cited

U.S. PATENT DOCUMENTS

| | | |
|---|---|---|
| 11,709,500 B2 | 7/2023 | Lloyd et al. |
| 11,736,312 B1 | 8/2023 | Xiao et al. |
| 11,838,884 B1 | 12/2023 | Dergosits et al. |
| 11,888,716 B1 | 1/2024 | Lloyd |
| 11,974,410 B1 | 4/2024 | Lin et al. |
| 2007/0015548 A1 | 1/2007 | Flick |
| 2020/0193740 A1 | 6/2020 | Sabina |
| 2023/0138858 A1 | 5/2023 | Bhardwaj et al. |
| 2024/0063596 A1 | 2/2024 | Pandian et al. |

\* cited by examiner

SYSTEMS AND METHODS FOR VALIDATING TELEMATICS DEVICE INSTALLATIONS

CROSS-REFERENCE TO RELATED APPLICATIONS

This application is a continuation of U.S. patent application Ser. No. 17/588,710 filed Jan. 31, 2022 and titled "SYSTEMS AND METHODS FOR VALIDATING TELEMATICS DEVICE INSTALLATIONS", which claims priority to U.S. Provisional Patent Application No. 63/300,137 filed Jan. 17, 2022 and titled "SYSTEMS AND METHODS FOR VALIDATING TELEMATICS DEVICE INSTALLATIONS", the contents of which are incorporated herein by reference for all purposes.

FIELD

The embodiments described herein generally relate to telematics devices, and in particular, to validating telematics device installations.

BACKGROUND

The following is not an admission that anything discussed below is part of the prior art or part of the common general knowledge of a person skilled in the art.

Telematics devices can collect various data from vehicles. Some telematics devices may require installation within the vehicle. For example, some telematics devices may require connection to the ODB-II (on-board diagnostics) port and/or CAN (controller area network) bus of the vehicle. However, it can be difficult to determine whether a telematics device is installed correctly. Many telematics devices do not have a display or other output to provide direct feedback to the installer. As a result, installations can be difficult to validate, even for professionals that are experienced in installing telematics devices.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with a broad aspect, there is provided a system for validating telematics device installations, the system includes at least one data storage and at least one processor in communication with the at least one data storage. The at least one data storage is operable to store telematics data collected from a telematics device installed in a vehicle. The at least one processor is operable to: subsequent to an installation of the telematics device in the vehicle by an installer, receive, from the installer, a device identifier corresponding to the telematics device; determine whether telematics data was received from the telematics device in a predetermined time period subsequent to the installation based at least on the device identifier; in response to determining that telematics data was received from the telematics device in the predetermined time period: present an indication to the installer that the telematics device was correctly installed in the vehicle; receive, from the installer, vehicle information associated with the vehicle; and store the vehicle information in association with the device identifier; and in response to determining that telematics data was not received from the telematics device in the predetermined time period: present an indication to the installer that the telematics device was not correctly installed in the vehicle; and store installation information in association with the device identifier, the installation information indicating at least whether telematics data was received from the telematics device in the predetermined time period.

In some embodiments, the at least one processor can be further operable to: in response to determining that telematics data was received from the telematics device in the predetermined time period: determine whether at least one accessory device is connected to the telematics device; and present an indication to the installer of whether at least one accessory device is connected to the telematics device.

In some embodiments, determining whether at least one accessory device is connected to the telematics device can involve receiving an indication whether at least one accessory device is connected to the telematics device from the telematics device.

In some embodiments, the installation information can further indicate whether at least one accessory device is connected to the telematics device.

In some embodiments, the at least one processor can be further operable to: in response to determining that telematics data was received from the telematics device in the predetermined time period: receive, from the installer, at least one image depicting the telematics device installed within the vehicle; and the installation information can include the at least one image.

In some embodiments, the at least one processor can be further operable to: prior to the installation of the telematics device in the vehicle by the installer, receive a purchase order for at least one installation of at least one telematics device, the at least one telematics device including the telematics device; and generate a work order for the at least one installation that is assignable to the installer.

In some embodiments, the at least one processor can be further operable to: receive, from the installer, a work order identifier corresponding to a work order associated with the installation of the telematics device; and the installation information can include the work order identifier.

In some embodiments, the at least one processor can be further operable to: determine whether the installation was completed based at least on the installation information; in response to determining that the installation was completed, permit the installer to submit a payment request for the installation; and in response to determining that the installation was not completed, do not permit the installer to submit a payment request for the installation.

In some embodiments, the at least one processor can be further operable to: receive, from the installer, a second device identifier corresponding to a second telematics device, the second telematics device having been removed from the vehicle during the installation of the telematics device; and the installation information can include the second device identifier.

In some embodiments, the telematics data can include engine data collected from the vehicle.

In some embodiments, the at least one processor can be remotely located from the telematics device and the vehicle.

In accordance with a broad aspect, there is provided a method for validating telematics device installations. The method involves operating at least one processor to: subsequent to an installation of a telematics device in a vehicle by an installer, receive, from the installer, a device identifier corresponding to the telematics device; determine whether telematics data was received from the telematics device in a predetermined time period subsequent to the installation based at least on the device identifier; in response to determining that telematics data was received from the telematics device in the predetermined time period: present an indication to the installer that the telematics device was correctly installed in the vehicle; receive, from the installer, vehicle information associated with the vehicle; and store the vehicle information in association with the device identifier; and in response to determining that telematics data was not received from the telematics device in the predetermined time period: present an indication to the installer that the telematics device was not correctly installed in the vehicle; and store installation information in association with the device identifier, the installation information indicating at least whether telematics data was received from the telematics device in the predetermined time period.

In some embodiments, the method can further involve operating the at least one processor to: in response to determining that telematics data was received from the telematics device in the predetermined time period: determine whether at least one accessory device is connected to the telematics device; and present an indication to the installer of whether at least one accessory device is connected to the telematics device.

In some embodiments, determining whether at least one accessory device is connected to the telematics device can involve receiving an indication whether at least one accessory device is connected to the telematics device from the telematics device.

In some embodiments, the installation information can further indicate whether at least one accessory device is connected to the telematics device.

In some embodiments, the method can further involve operating the at least one processor to: in response to determining that telematics data was received from the telematics device in the predetermined time period: receive, from the installer, at least one image depicting the telematics device installed within the vehicle; and the installation information can include the at least one image.

In some embodiments, the method can further involve operating the at least one processor to: prior to the installation of the telematics device in the vehicle by the installer, receive a purchase order for at least one installation of at least one telematics device, the at least one telematics device including the telematics device; and generate a work order for the at least one installation that is assignable to the installer.

In some embodiments, the method can further involve operating the at least one processor to: receive, from the installer, a work order identifier corresponding to a work order associated with the installation of the telematics device; and the installation information can include the work order identifier.

In some embodiments, the method can further involve operating the at least one processor to: determine whether the installation was completed based at least on the installation information; in response to determining that the installation was completed, permit the installer to submit a payment request for the installation; and in response to determining that the installation was not completed, do not permit the installer to submit a payment request for the installation.

In some embodiments, the method can further involve operating the at least one processor to: receive, from the installer, a second device identifier corresponding to a second telematics device, the second telematics device having been removed from the vehicle during the installation of the telematics device; and the installation information can include the second device identifier.

In some embodiments, the telematics data can include engine data collected from the vehicle.

In some embodiments, the at least one processor can be remotely located from the telematics device and the vehicle.

In accordance with a broad aspect, there is provided a non-transitory computer readable medium having instructions stored thereon executable by at least one processor to implement the method of any of the methods described herein.

BRIEF DESCRIPTION OF THE DRAWINGS

Several embodiments will be described in detail with reference to the drawings, in which.

Figure 1:
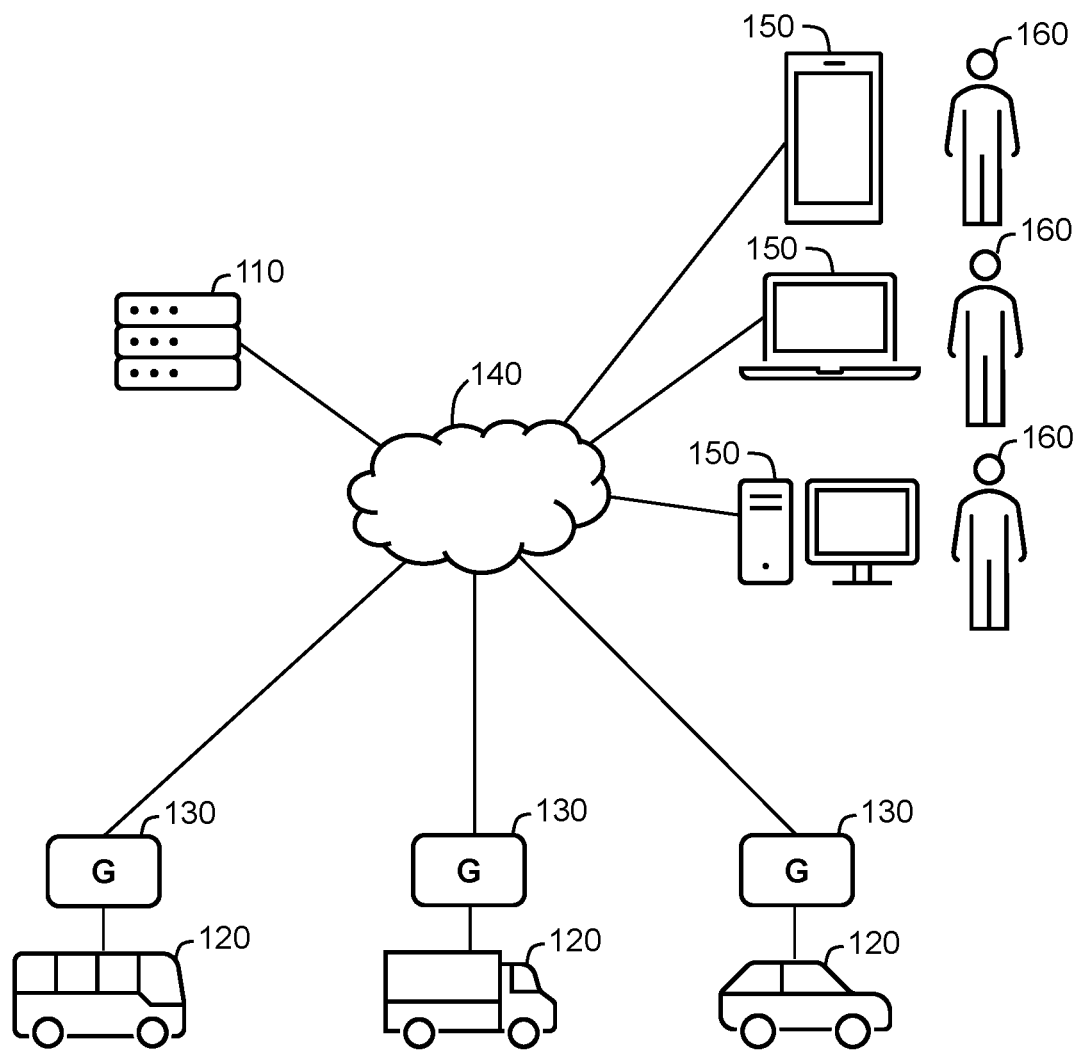
FIG. 1 is a block diagram of various components interacting with an example fleet management system and a plurality of telematics devices, in accordance with an embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DETAILED DESCRIPTION

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Referring to FIG. 1, there is shown an example fleet management system 110 for managing a plurality of vehicles 120 equipped with a plurality of telematics devices 130. In operation, the telematics devices 130 can collect various data associated with the vehicles 120 (i.e., telematics data) and share the telematics data with the fleet management system 110. The fleet management system 110 can be remotely located from the telematics devices 130 and the vehicles 120.

The vehicles 120 may include any machines for transporting goods or people. The vehicles 120 can include motor vehicles, such as, but not limited to, motorcycles, cars, trucks, and/or buses. The motor vehicles can be gas, diesel, electric, hybrid, and/or alternative fuel. In some cases, the vehicles 120 may include other kinds of vehicles, such as, but not limited to, railed vehicles (e.g., trains, trams), watercraft (e.g., ships, boats), aircraft (e.g., airplanes, helicopters), and/or spacecraft. Each vehicle 120 can be equipped with a telematics device 130.

The telematics devices 130 can be standalone devices that are removably installed in the vehicles 120. Alternatively, the telematics devices 130 can be integrated components that are integral with the vehicles 120. The telematics devices 130 can collect various telematics data and share the telematics data with the fleet management system 110. The telematics data may include any information, parameters, attributes, characteristics, and/or features associated with the vehicles 120. For example, the telematics data can include, but is not limited to, location data, speed data, acceleration data, engine data, brake data, transmission data, fluid data (e.g., oil, coolant, and/or washer fluid), energy data (e.g., battery and/or fuel level), odometer data, vehicle identifying data, error/diagnostic data, tire data, seatbelt data, and/or airbag data. In some cases, the telematics data may also include information related to the telematics devices 130 and/or other devices associated with the telematics devices 130.

The fleet management system 110 can process the telematics data collected from the telematics devices 130 to provide various analysis and reporting. For example, the fleet management system 110 can process the telematics data to gain additional information regarding the vehicles 120, such as, but not limited to, trip distances/times, idling times, harsh braking/driving, usage rate, and/or fuel economy. Various data analytics and machine learning techniques may be used by the fleet management system 110 to process the telematics data. The telematics data can then be used to manage various aspects of the vehicles 120, such as, but not limited to, route planning, vehicle maintenance, driver compliance, asset utilization, and/or fuel management. In this manner, the fleet management system 110 can improve the productivity, efficiency, safety, and/or sustainability of the vehicles 120.

A plurality of computing devices 150 can provide access to the fleet management system 110 to a plurality of users 160. This may allow the users 160 to manage and track the vehicles 120, for example, using various telematics data collected and/or processed by the fleet management system 110. This may also provide the users 160 with various functionality for managing the telematics devices 130. For example, the computing devices 150 may allow the users 160 to place purchases, request technical support, manage services and billing, and/or validate installations for the telematics devices 130. The computing devices 150 can be any computers or computer systems, such as, but not limited to, personal computers, portable computers, wearable computers, workstations, desktops, laptops, smartphones, tablets, smartwatches, PDAs (personal digital assistants), and/or mobile devices. The computing devices 150 can be remotely located from the fleet management system 110, telematics devices 130 and vehicles 120.

The fleet management system 110, telematics devices 130, and computing devices 150 can communicate through a network 140. The network 140 may include more than one network. The network 140 may be wireless, wired, or a combination thereof. The network 140 may employ any communication protocol and utilize any communication medium. For example, the network 140 may include, but is not limited to, Wi-Fi™ networks, Ethernet networks, Bluetooth™ networks, NFC (near-field communication) networks, radio networks, cellular networks, and/or satellite networks. The network 140 may be private, public, or a combination thereof. For example, the network 140 may include, but is not limited to, LANs (local area networks), WANs (wide area networks), and/or the Internet. The network 140 may also facilitate communication with other devices and systems that are not shown.

Figure 2:
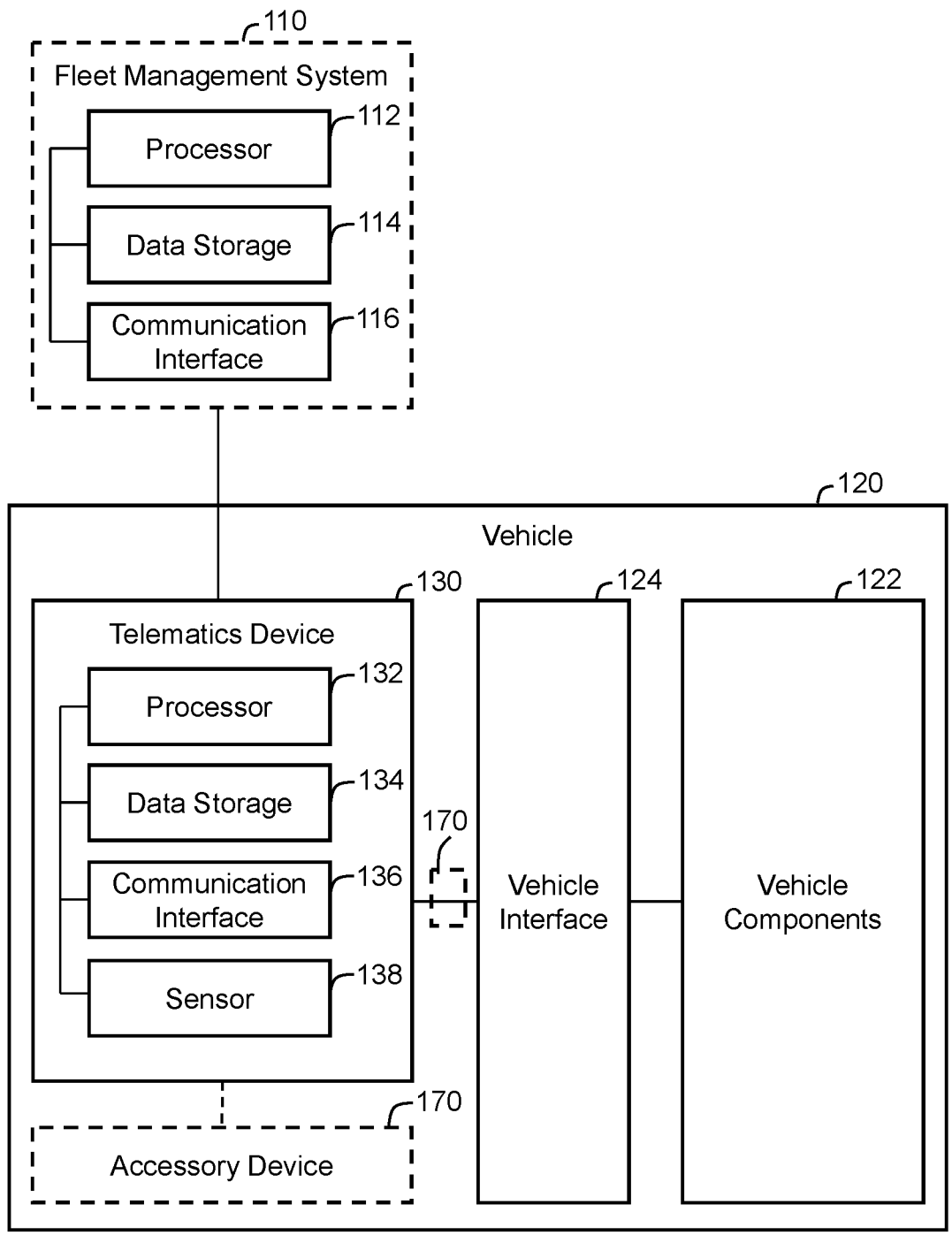
FIG. 2 is a block diagram of the fleet management system shown in FIG. 1 interacting with one of the telematics devices and one of the vehicles shown in FIG. 1, in accordance with an embodiment.

Reference will now be made to FIG. 2 to further explain the operation of the fleet management system 110, telematics devices 130, and vehicles 120. In the illustrated example, the fleet management system 110 in communication with a telematics device 130 that is installed in a vehicle 120. As shown, the fleet management system 110 can include a processor 112, a data storage 114, and a communication interface 116. Each of these components may communicate with each other. Each of these components may be combined into fewer components or divided into additional subcomponents. Two or more of these components and/or subcomponents may be distributed across a wide geographical area. The fleet management system 110 can be implemented using one or more computers or computer systems. For example, the fleet management system 110 may be implemented using one or more servers. The servers can be distributed across a wide geographical area. In some embodiments, the fleet management system 110 may be implemented using a cloud computing platform, such as Google Cloud Platform™ or Amazon Web Services™.

The processor 112 can control the operation of the fleet management system 110. The processor 112 can be implemented using any suitable processing devices or systems, such as, but not limited to, CPUs (central processing units), GPUs (graphics processing units), FPGAs, (field programmable gate arrays), ASICs (application specific integrated circuits), DSPs (digital signal processors), NPUs (neural processing units), QPUs (quantum processing units), microprocessors, and/or controllers. The processor 112 can execute various computer instructions, programs, and/or software stored on the data storage 114 to implement various methods described herein. For example, the processor 112 can process various telematics data collected by the fleet management system 110 from the telematics devices 130 and determine whether telematics data was received from a particular telematics device 130.

The data storage 114 can store various data for the fleet management system 110. The data storage 114 can be implemented using any suitable data storage devices or systems, such as, but not limited to, RAM (random access memory), ROM (read only memory), flash memory, HDD (hard disk drives), SSD (solid-state drives), magnetic tape drives, optical disc drives, and/or memory cards. The data storage 114 may include volatile memory, non-volatile memory, or a combination thereof. The data storage 114 may include non-transitory computer readable media. The data storage 114 can store various computer instructions, programs, and/or software that can be executed by the processor 112 to implement various methods described herein. The data storage 114 may store various telematics data collected from the telematics devices 130 and/or processed by the processor 112. The data storage 114 can also store various vehicle information and installation information collected from an installer.

The communication interface 116 can enable communication between the fleet management system 110 and other devices or systems, such as the telematics device 130. The communication interface 116 can be implemented using any suitable communication devices or systems. For example, the communication interface 116 may include various physical connectors, ports, or terminals, such as, but not limited to, USB (universal serial bus), Ethernet, Thunderbolt, Firewire, SATA (serial advanced technology attachment), PCI (peripheral component interconnect), HDMI (high-definition multimedia interface), and/or DisplayPort. The communication interface 116 can also include various wireless interface components to connect to wireless networks, such as, but not limited to, Wi-Fi™, Bluetooth™, NFC, cellular, and/or satellite. The communication interface 116 can enable various inputs and outputs to be received at and sent from the fleet management system 110. For example, the communication interface 116 may be used to retrieve telematics data from the telematics device 130. The communication interface 116 can also be used to transmit or receive various telematics data, vehicle information, and installation information to or from the computing devices 150.

The telematics device 130 also can include a processor 132, a data storage 134, and a communication interface 136. Additionally, the telematics device 130 can include a sensor 138. Each of these components may communicate with each other. Each of these components may be combined into fewer components or divided into additional subcomponents.

The processor 132 can control the operation of the telematics device 130. Like the processor 112 of the fleet management system 110, the processor 132 of the telematics device 130 can be implemented using any suitable processing devices or systems. The processor 132 can execute various computer instructions, programs, and/or software stored on the data storage 134. For example, the processor 132 can process various telematics data collected from the vehicle components 142 or the sensor 138.

The data storage 134 can store various data for the telematics device 130. Like the data storage 114 of the fleet management system 110, the data storage 134 of the telematics device 130 can be implemented using any suitable data storage devices or systems. The data storage 134 can store various computer instructions, programs, and/or software that can be executed by the processor 132. The data storage 134 can also store various telematics data collected from the vehicle components 142 or the sensor 138.

The communication interface 136 can enable communication between the telematics device 130 and other devices or systems, such as the fleet management system 110 and vehicle components 142. Like the communication interface 116 of the fleet management system 110, the communication interface 136 of the telematics device 130 can be implemented using any suitable communication devices or systems. The communication interface 136 can enable various inputs and outputs to be received at and sent from the telematics device 130. For example, the communication interface 136 may be used collect telematics data from the vehicle components 142 and sensor 138 or to send telematics data to the fleet management system 110. The communication interface 136 can also be used to connect the telematics device 130 with one or more accessory devices 170.

The sensor 138 can detect and/or measure various environmental events and/or changes. The sensor 138 can include any suitable sensing devices or systems, including, but not limited to, location sensors, velocity sensors, acceleration sensors, orientation sensors, vibration sensors, proximity sensors, temperature sensors, humidity sensors, pressure sensors, optical sensors, and/or audio sensors. When the telematics device 130 is installed in the vehicle 120, the sensor 138 can be used to collect telematics data that may not be obtainable from the vehicle components 142. For example, the sensor 138 may include a satellite navigation device, such as, but not limited to, a GPS (global positioning system) receiver, which can measure the location of the vehicle 120. Additionally, or alternatively, the sensor 138 may include accelerometers, gyroscopes, magnetometers, and/or IMUs (inertial measurement units), which can measure the acceleration and/or orientation of the vehicle 120.

The telematics device 130 may operate in together with one or more accessory devices 170 that are in communication with the telematics device 130. The accessory devices 170 can include expansion devices that can provide additional functionality to the telematics device 130. For example, the accessory devices 170 may provide additional processing, storage, communication, and/or sensing functionality through one or more additional processors, data storages, communication interfaces, and/or sensors (not shown). The accessory devices 170 can also include adapter devices that facilitate communication between the communication interface 136 and the vehicle interface 124, such as a cable harness.

The telematics device 130 can be installed within the vehicle 120, removably or integrally. One or more accessory devices 170 can also be installed in the vehicle 120 along with the telematics device 130. The vehicle 120 can include vehicle components 122 and a vehicle interface 124. Each of these components may be combined into fewer components or divided into additional subcomponents.

The vehicle components 122 can include any subsystems, parts, and/or subcomponents of the vehicle 120. The vehicle components 122 can be used to operate and/or control the vehicle 120. For example, the vehicle components 122 can include, but are not limited to, powertrains, engines, transmissions, steering, braking, seating, batteries, doors, and/or suspensions. The telematics device 130 can collect various telematics data from the vehicle components 122. For example, the telematics device 130 may communicate with one or more ECUs (electronic control units) that control the vehicle components 142 and/or one or more internal vehicle sensors.

The vehicle interface 124 can facilitate communication between the vehicle components 122 and other devices or systems. The vehicle interface 124 can include any suitable communication devices or systems. For example, the vehicle interface 124 may include, but is not limited to, an ODB-II (on-board diagnostics) port and/or CAN (controller area network) bus. The vehicle interface 124 can be used by the telematics device 130 to collect telematics data from the vehicle components 122. For example, the communication interface 136 of the telematics device 130 can be connected to the vehicle interface 124 to communicate with the vehicle components 122. In some cases, an accessory device 170, such as a wire harness, can provide the connection between the communication interface 136 and the vehicle interface 124.

Figure 3:
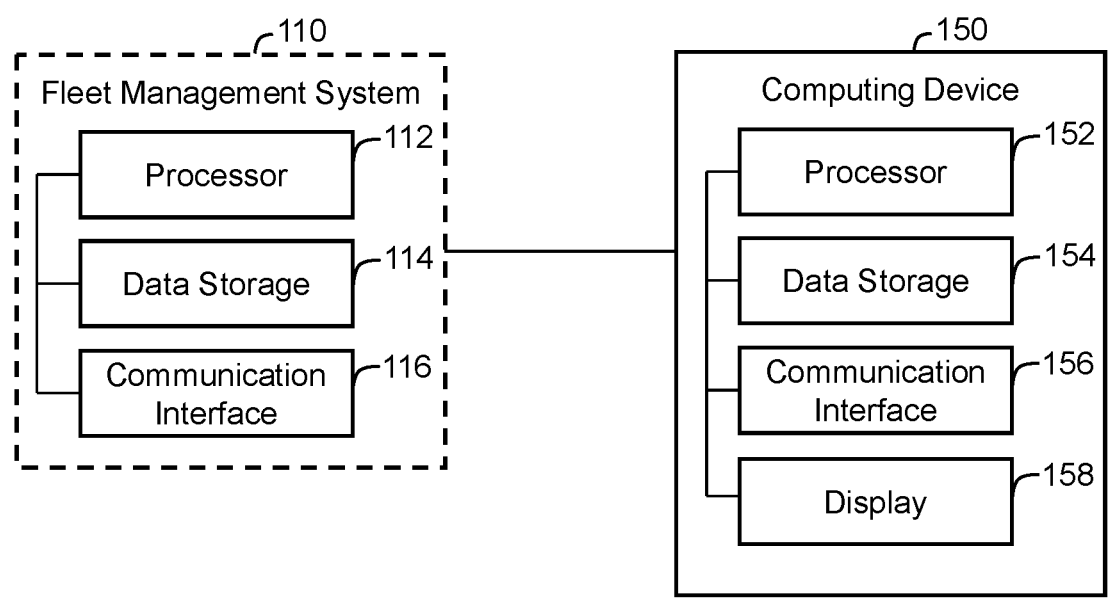
FIG. 3 is a block diagram of the fleet management system shown in FIG. 1 interacting with one of the computing devices shown in FIG. 1, in accordance with an embodiment.

Reference will now be made to FIG. 3 to further explain the operation of the fleet management system 110 and computing devices 150. In the illustrated example, the fleet management system 110 in communication with a computing device 150. As shown, the computing device 150 also can include a processor 152, a data storage 154, and a communication interface 156. Additionally, the computing device 150 can include a display 158. Each of these components can communicate with each other. Each of these components may be combined into fewer components or divided into additional subcomponents.

The processor 152 can control the operation of the computing device 150. Like the processor 112 of the fleet management system 110 and the processor 132 of the telematics device 130, the processor 152 of the computing device 150 can be implemented using any suitable processing devices or systems. The processor 152 can execute various computer instructions, programs, and/or software stored on the data storage 154 to implement various methods described herein. For example, the processor 112 can process various telematics data and determine whether telematics data was received from a particular telematics device 130.

The data storage 154 can store various data for the computing device 150. Like the data storage 114 of the fleet management system 110 and the data storage 134 of the telematics device 130, the data storage 154 of the computing device 150 can be implemented using any suitable data storage devices or systems. The data storage 154 can store various computer instructions, programs, and/or software that can be executed by the processor 152 to implement various methods described herein. The data storage 154 can also store various telematics data, vehicle information and installation information.

The communication interface 156 can enable communication between the computing device 150 and other devices or systems, such as the fleet management system 110. Like the communication interface 116 of the fleet management system 110 and the communication interface 136 of the telematics device 130, the communication interface 156 of the computing device 150 can be implemented using any suitable communication devices or systems. The communication interface 156 can enable various inputs and outputs to be received at and sent from the computing device 150. For example, the communication interface 156 may be used to retrieve or transmit various telematics data, vehicle information, and installation information from or to the fleet management system 110.

The display 158 can visually present various data for the computing device 150. The display 158 can be implemented using any suitable display devices or systems, such as, but not limited to, LED (light-emitting diode) displays, LCDs (liquid crystal displays), ELDs (electroluminescent displays), plasma displays, quantum dot displays, and/or cathode ray tube (CRT) displays. The display 158 can be an integrated component that is integral with the computing device 150 or a standalone device that is removably connected to the computing device 150. The display 158 can present various user interfaces for various computer applications, programs, and/or software associated with various methods described herein. For example, the display 158 may be used to collect and display various vehicle information and installation information.

Figure 4:
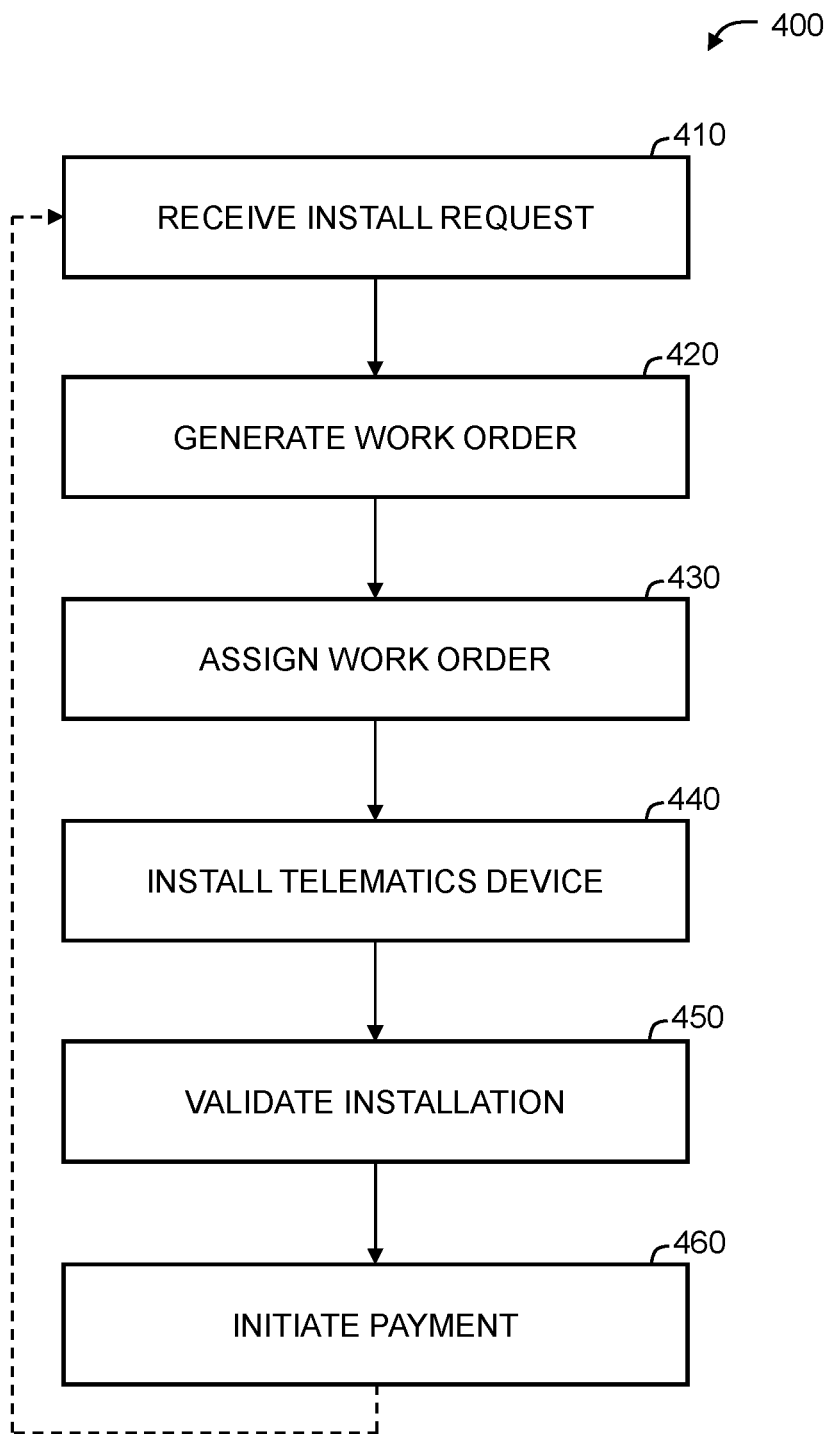
FIG. 4 is a flowchart of an example method for installing telematics devices, in accordance with an embodiment.

Reference will now be made to FIG. 4 to explain the installation process for a telematics device 130. In the illustrated example, there is shown an example method 400 for installing telematics devices 130. Various aspects of method 400 may be performed by the fleet management system 110 (e.g., processor 112), one or more computing devices 150 (e.g., processor 152), or a combination thereof.

At 410, a request to install at least one telematics device 130 can be received. For example, the fleet management system 110 (e.g., processor 112) may receive an installation request from a computing device 150 (e.g., processor 152). The installation request may be received in various ways. In some cases, the installation request may be received in the form of a purchase order. For example, a purchase order may be generated in response to a customer purchasing an installation service for one or more telematic devices 130. Alternatively, the installation request may be received in the form of a request to service, fix, or repair one or more telematic devices 130.

At 420, a work order for the at least one installation can be generated. For example, the fleet management system 110 (e.g., processor 112) can generate the work order. The work order can be generated based on the installation request. For example, the work order can be automatically generated in response to receiving a purchase order for at least one installation of at least one telematics device 130.

At 430, the work order can be assigned to an installer. The installer can generally be any individual or group of individuals who can perform the installation of the at least one telematics device 130. The installer may be specialized in telematics device installations, particularly those involving the at least one telematics device 130. The assignment of the work order can be automatic or manual. For example, the work order may be assigned based on predetermined criteria associated with a plurality of available installers and the work order. Alternatively, the work order may be manually assigned by a user.

At 440, at least one telematics device 130 can be installed in at least one vehicle 120. The telematics device 130 can be installed by the installer who was assigned the work order for the installation. The specifics of the installation may vary depending on the type of telematics device 130 and the type of installation. For example, the installation may involve connecting a telematics device 130 to a vehicle interface 124, such as an ODB-II port or CAN bus. The installation may also involve connecting a telematics device 130 to one or more accessory devices 170. The installation can involve providing electrical power to a telematics device 130 and/or accessory device 170. In general, the installation can involve any act of activating, turning on, fixing, or otherwise making the telematics device 130 ready for operation. The installation may involve adding a new telematics device 130 to the vehicle 120, replacing an existing telematics device 130 in the vehicle 130, or servicing an existing telematics device 130 in the vehicle 120.

At 450, the installation of the at least one telematics device 130 can be validated. In other words, it can be determined whether the installation was completed correctly. Typically, validation involves the installer examining a telematics device 130 to assess whether the device is operational. However, direct examination of the device can provide limited information regarding whether the telematics device 130 was installed correctly. In many cases, the telematics device 130 may provide limited or no direct feedback to the installer, since many telematics devices 130 do not include a display or other direct output for the installer to troubleshoot. Hence, it can be difficult to determine whether a telematics device 130 is correctly installed, even for an experienced installer.

At 460, at least one payment can be initiated. In this manner, the installer can be paid for performing the installation. It would be beneficial to prevent payment from being issued to the installer unless it is determined that the installation was completed correctly. However, given the aforementioned issues with installation validation, it may be difficult to implement such a process.

Various methods for validating telematics device installations will now be described with reference to FIGS. 5-15. These validation methods generally involve determining whether a telematics device 130 is correctly installed based on telematics data received from the telematics device 130. As a result, these methods may provide greater validation accuracy as compared to direct inspection of the device. These validation methods can allow installers and device providers to troubleshoot installations, improving the process for both installers and customers. These validation methods can also be used to establish payment permissions.

Figure 5:
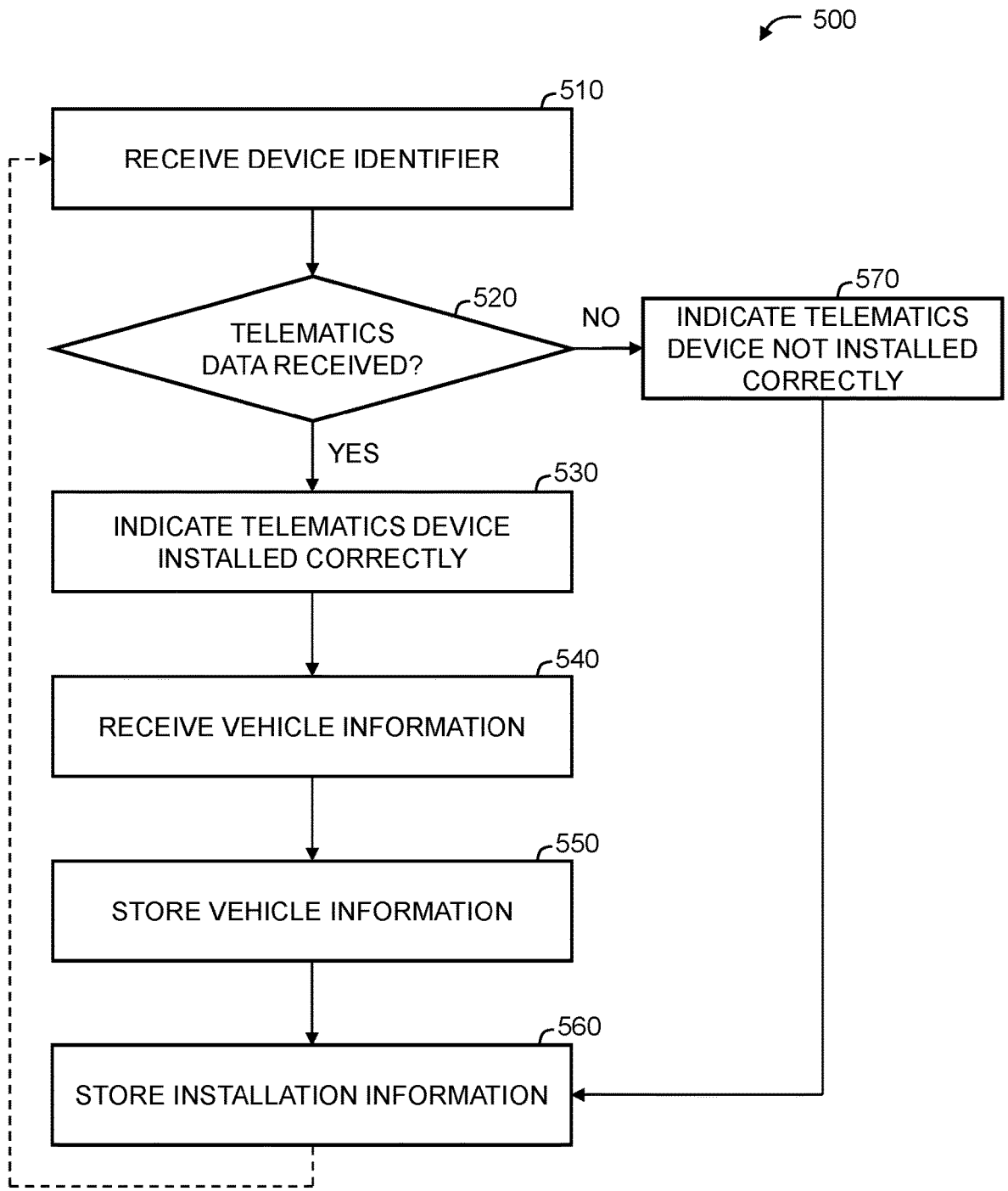
FIG. 5 is a flowchart of an example method for validating telematics device installations, in accordance with an embodiment.

Referring to FIG. 5, there is shown an example method 500 for validating telematics device installations. Method 500 can be implemented by the fleet management system 110, one or more computing devices 150, or a combination thereof. That is, method 500 can be implemented by operating at least one processor of the fleet management system 110 and/or one or more computing devices 150. For example, method 500 can be implemented by the processor 112 and/or the processor 152 executing instructions stored on the data storage 114 and/or the data storage 154. An advantage of executing one or more steps of method 500 at the fleet management system 110 (i.e., remote from the computing device 150) is that less processing may be completed at the computing devices 150. Hence, the hardware complexity and cost of the computing devices 150 can be reduced. Furthermore, it may be easier to update and/or modify software running on the fleet management system 110 as compared to a computing device 150. An advantage of executing one or more steps of method 500 at the computing device 150 (i.e., remote from the fleet management system 110) is that less data may be transmitted between the fleet management system 110 and the computing device 150. Hence, network usage and bandwidth on the network 140 can be reduced. This may reduce usage costs associated with the network 140.

At 510, a device identifier corresponding to a telematics device 130 can be received. The device identifier can be used to identify the telematics device 130. The device identifier can be any suitable identifier, such as, but not limited to, a serial number, code, and/or key. The device identifier may include numbers, letters, symbols, and/or a combination thereof. The device identifier can be a unique identifier, for example, when each telematics device 130 is assigned a device identifier that uniquely identifies that telematics device 130.

The device identifier can be received subsequent to an installation of the telematics device 130 in a vehicle 120. The device identifier can be received from an installer. For example, the installer may input the device identifier into a computing device 150 (e.g., using communication interface 156 and/or display 158). The device identifier can be received in various ways. For example, the device identifier may be received in text, image, or audio form. Various image or voice recognition techniques may be used to decode or translate the corresponding images or audio.

Figure 6:
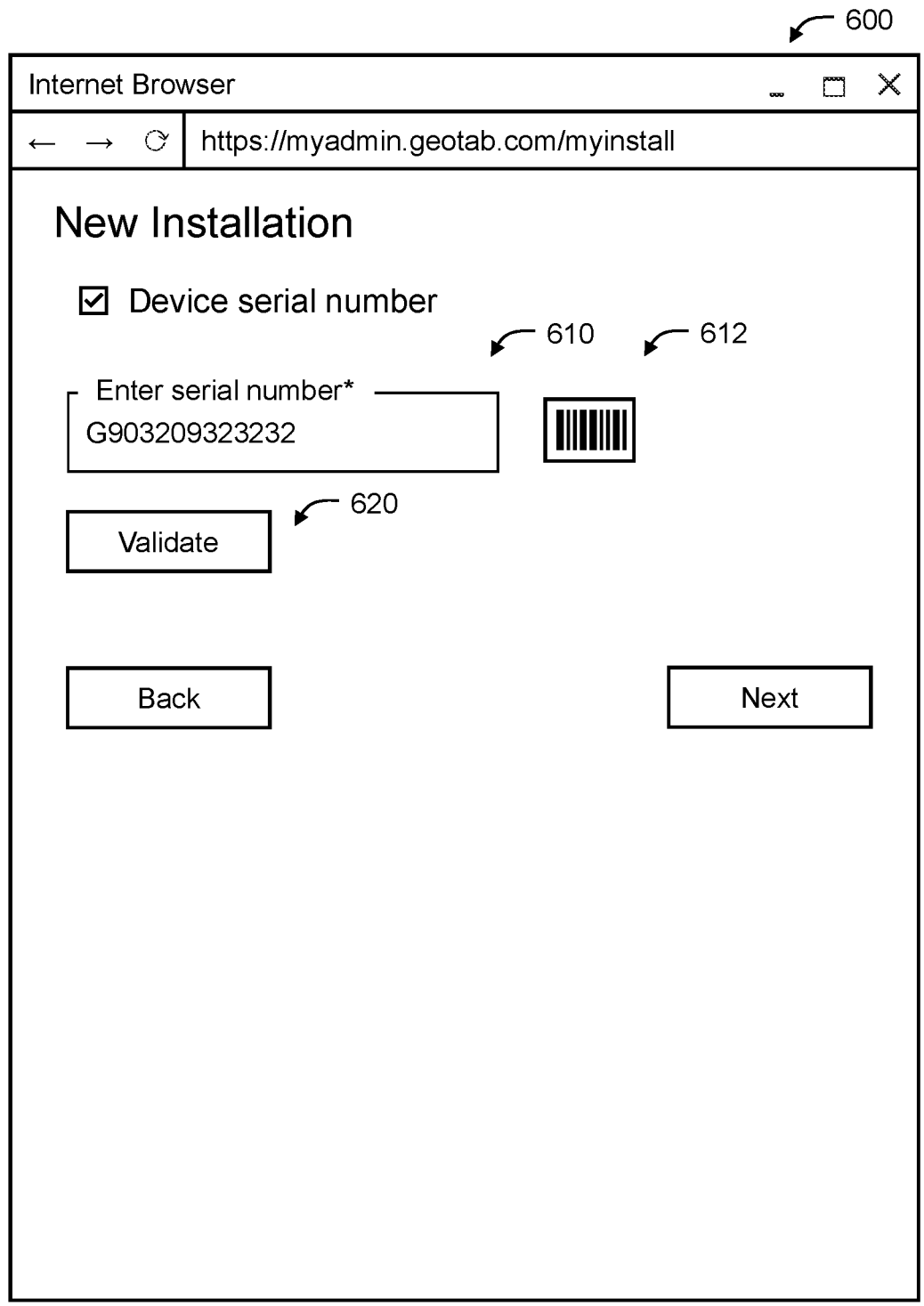
FIG. 6 shows an example user interface for receiving a device identifier, in accordance with an embodiment.

Referring to FIG. 6, there is shown an example user interface 600 for receiving a device identifier. User interface 600 can be displayed on a computing device 150 (e.g., using display 158) operated by an installer. As shown, in the illustrated example, the installer may provide the device identifier as text using input field 610. Alternatively, an image of a barcode representing the device identifier can be captured and decoded by selecting camera button 612.

In some embodiments, the device identifier can be validated. That is, the validity of the device identifier can be tested. For example, the computing device 150 (e.g., processor 152) and/or the fleet management system 110 (e.g., processor 112) may validate the device identifier. In the illustrated example, the device identifier can be validated in response to the installer selecting the validate button 620. The device identifier can be validated in various ways. In some cases, the device identifier may be tested to check whether the device identifier complies with a particular format, for example, based on an expected number, order, and/or type of characters. Additionally, or alternatively, the device identifier may be tested to check whether there is an existing record of the device identifier, for example, by checking whether the device identifier exists in a database maintained by the fleet management system 110 (e.g., using data storage 114).

Referring back to FIG. 5, at 520, it can be determined whether telematics data was received from the telematics device 130. If it is determined that telematics data was received from the telematics device 130, method 500 can proceed to 530. If it is determined that telematics data was not received from the telematics device 130, method 500 can proceed to 570. The reception of telematics data from the telematics device 130 can signify that the telematics device 130 is operational and therefore was correctly installed in the vehicle 120. In contrast, the absence of receiving telematics data from the telematics device 130 can indicate that the telematics device 130 is not operational and therefore was not correctly installed in the vehicle 120.

In some embodiments, the determination can involve determining whether telematics data was received from the telematics device 130 in a predetermined time period. The predetermined time period can generally correspond to any amount of time, beginning and ending at any time. In some cases, the predetermined time period can correspond to a period of time immediately preceding the determination. For example, the determination may involve determining whether telematics data was received from the telematics device 130 in the last 1 hour, 2 hours, 4 hours, 8 hours, 12 hours, 24 hours, 48 hours, etc. The predetermined time period can be subsequent to the installation. That is, at least a portion of the predetermined time period may occur subsequent to the installation of the telematics device 130.

The determination can be made based at least on the device identifier. For example, the device identifier can be used to identify the telematics device 130, and the computing device 150 (e.g., processor 152) and/or the fleet management system 110 (e.g., processor 112) can determine whether telematics data was received from the identified telematics device 130. This may involve determining whether telematics data corresponding to the identified telematics device 130 and the predetermined time period exists at the fleet management system 110 (e.g., data storage 114) and/or computing device 150 (e.g., data storage 154).

In general, the telematics data can generally include any data associated with the vehicle 120, and the determination can involve determining whether any type of telematics data was received. However, in some cases, the determination may involve determining whether a specific type of telematics data was received from the telematics device 130. For example, the determination may involve determining whether engine data and/or location data was received from the telematics device 130.

At 530, an indication that the telematics device 130 was correctly installed in the vehicle 120 can be presented. The indication can be presented in response to determining that telematics data was received from the telematics device 130. The reception of telematics data from the telematics device 130 can signify that the telematics device 130 is operational and therefore was correctly installed in the vehicle 120.

The indication can be presented to the installer. For example, the indication can be presented at the computing device 150 (e.g., using display 158 and/or communication interface 156) operated by the installer. The indication can generally be any signal that indicates to the installer that the telematics device 130 was correctly installed in the vehicle. For example, the indication may be an alert, notification, and/or other message presented at the computing device 150. The indication may involve displaying visual elements, such as, but not limited to, images, text, or other graphical elements. Alternatively, or additionally, the indication may include performing auditory and/or haptic elements. That is, the indication may include audio, vibrations, and/or the like.

Figure 7A:
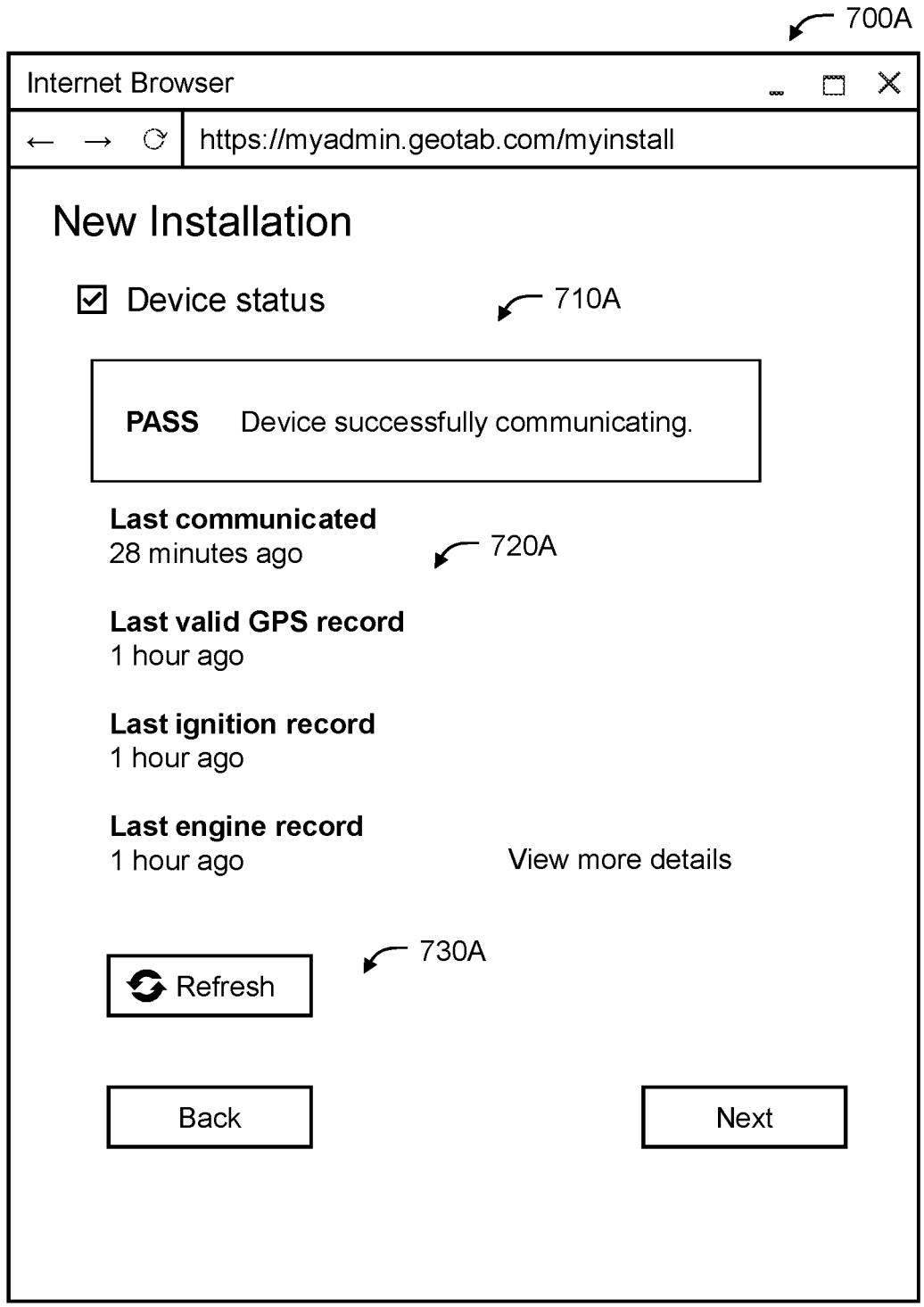
FIG. 7A shows an example user interface for indicating that a telematics device was correctly installed, in accordance with an embodiment.

Referring to FIG. 7A, there is shown an example user interface 700A for indicating that a telematics device 130 was correctly installed. User interface 700A can be displayed on the computing device 150 (e.g., using display 158) operated by the installer. As shown, user interface 700A can indicate that the telematics device 130 was correctly installed using one or more graphical elements 710. In the illustrated example, the graphical element 710A includes the text "PASS" to indicate that the telematics device 130 was correctly installed. As shown, various other information can also be presented to the installer. In the illustrated example, additional information 720A regarding specific types of telematics data and when they were received are also presented on user interface 700A.

In some embodiments, the information displayed on the user interface 700A can be updated. For instance, in the illustrated example, the installer can select the refresh button 730A. In response, the graphical element 710A and additional information 720A can be updated based on whether any new telematics data was received from the telematics device 130.

Referring back to FIG. 5, at 540, vehicle information associated with the vehicle 120 can be received. The vehicle information can generally include any information associated with the vehicle 120. For example, the vehicle information can include information for identifying the vehicle 120, such as, but not limited to, vehicle name, license plate number, VIN (Vehicle Identification Number), vehicle make, and/or vehicle model. The vehicle information may also include information pertaining to the state of the vehicle, such as, but not limited to, odometer reading, engine hours, etc. The vehicle information may also include additional information related to vehicle 120, such as comments provided by the installer relating to the installation.

The vehicle information can be received from the installer. For example, the installer can input the vehicle information into the computing device 150 (e.g., using communication interface 156 and/or display 158). The vehicle information can be received in various ways. For example, the vehicle information may be received in text, image, or audio form. Various image or voice recognition techniques may be used to decode or translate the corresponding images or audio recordings.

Figure 8:
FIG. 8 shows an example user interface for receiving vehicle information, in accordance with an embodiment.

Referring to FIG. 8, there is shown an example user interface 800 for receiving vehicle information. User interface 800 can be displayed on the computing device 150 (e.g., using display 158) operated by the installer. As shown, vehicle information can be entered by the installer using various text input fields 810 on the user interface 800. In addition, vehicle information can be provided by the installer in the form of an image captured and decoded by selecting camera button 812.

Referring back to FIG. 5, at 550, the vehicle information can be stored. The vehicle information can be stored in association with the device identifier. In this manner, the vehicle information can be associated with the telematics device 130. For example, the vehicle information can be stored by the fleet management system 110 (e.g., using data storage 114) and/or a computing device 150 (e.g., using data storage 154). In this manner, vehicle information can be collected from the installer and stored as a part of the installation process. Saving the vehicle information in this manner can provide insight for a subsequent user regarding the vehicle 120 that the telematics device 130 was installed in. It may also eliminate the need for a subsequent user to provide vehicle information themselves. It should be appreciated that vehicle information may only be collected and stored if telematics data was received from the telematics device 130 (i.e., if the telematics device 130 was installed correctly). Hence, vehicle information need not be collected nor stored if the telematics device 130 was not correctly installed. This may reduce the amount of unnecessary and possibly incorrect information that is collected and stored.

At 570, an indication that the telematics device 130 was not correctly installed in the vehicle 120 can be presented. The indication can be presented in response to determining that telematics data was not received from the telematics device 130. The absence of receiving telematics data from the telematics device 130 can indicate that the telematics device 130 is not operational and therefore was not correctly installed in the vehicle 120. Similar to at 530, the indication can be presented to the installer and can generally be any signal that indicates to the installer that the telematics device 130 was not correctly installed in the vehicle. For example, the indication can be presented at the computing device 150

(e.g., using display 158 and/or communication interface 156) operated by the installer.

Figure 7B:
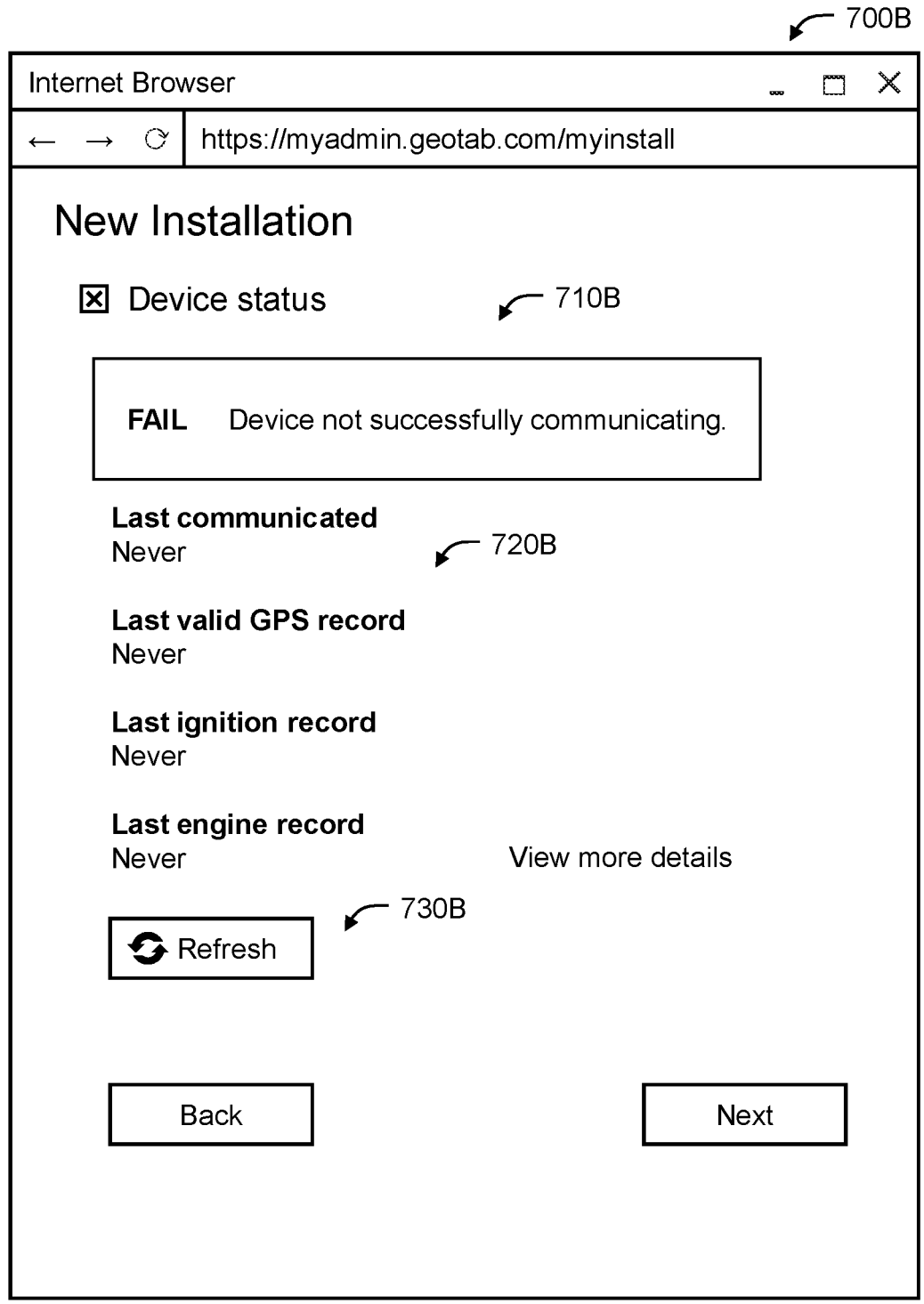
FIG. 7B shows an example user interface for indicating that a telematics device was not correctly installed, in accordance with an embodiment.

Referring to FIG. 7B, there is shown an example user interface 700B for indicating that a telematics device 130 was not correctly installed. User interface 700B can be displayed on the computing device 150 (e.g., using display 158) operated by the installer. As shown, user interface 700B can indicate that the telematics device 130 was not correctly installed using one or more graphical elements 710B. In the illustrated example, the graphical element 710 includes the text "FAIL" to indicate that the telematics device 130 was not correctly installed. As shown, various other information can also be presented to the installer. For instance, in the illustrated example, additional information 720B regarding specific types of telematics and when they were received are also presented on user interface 700B. Similar to user interface 700A, the information displayed on the user interface 700A can be updated in response to the installer selecting the refresh button 730B.

Referring back to FIG. 5, at 560, installation information can be stored. For example, the installation information can be stored by the fleet management system 110 (e.g., using data storage 114) and/or a computing device 150 (e.g., using data storage 154). The installation information can be stored in association with the device identifier. In this manner, various information associated with the installation can be associated with the telematics device 130.

The installation information can generally include any information associated with the installation of the telematics device 130. For example, the installation information can indicate whether telematics data was received from the telematics device 130. As described herein, the presence or absence of receiving telematics data from the telematics device 130 can indicate whether the telematics device 130 was correctly installed in the vehicle 120. Hence, the installation information can indicate whether the telematics device 130 was correctly installed in the particular vehicle 120. The installation information can provide insight for a subsequent user regarding the installation of the telematics device 130. For example, the installation information may be used to troubleshoot why a particular installation was successful or unsuccessful.

Figure 9:
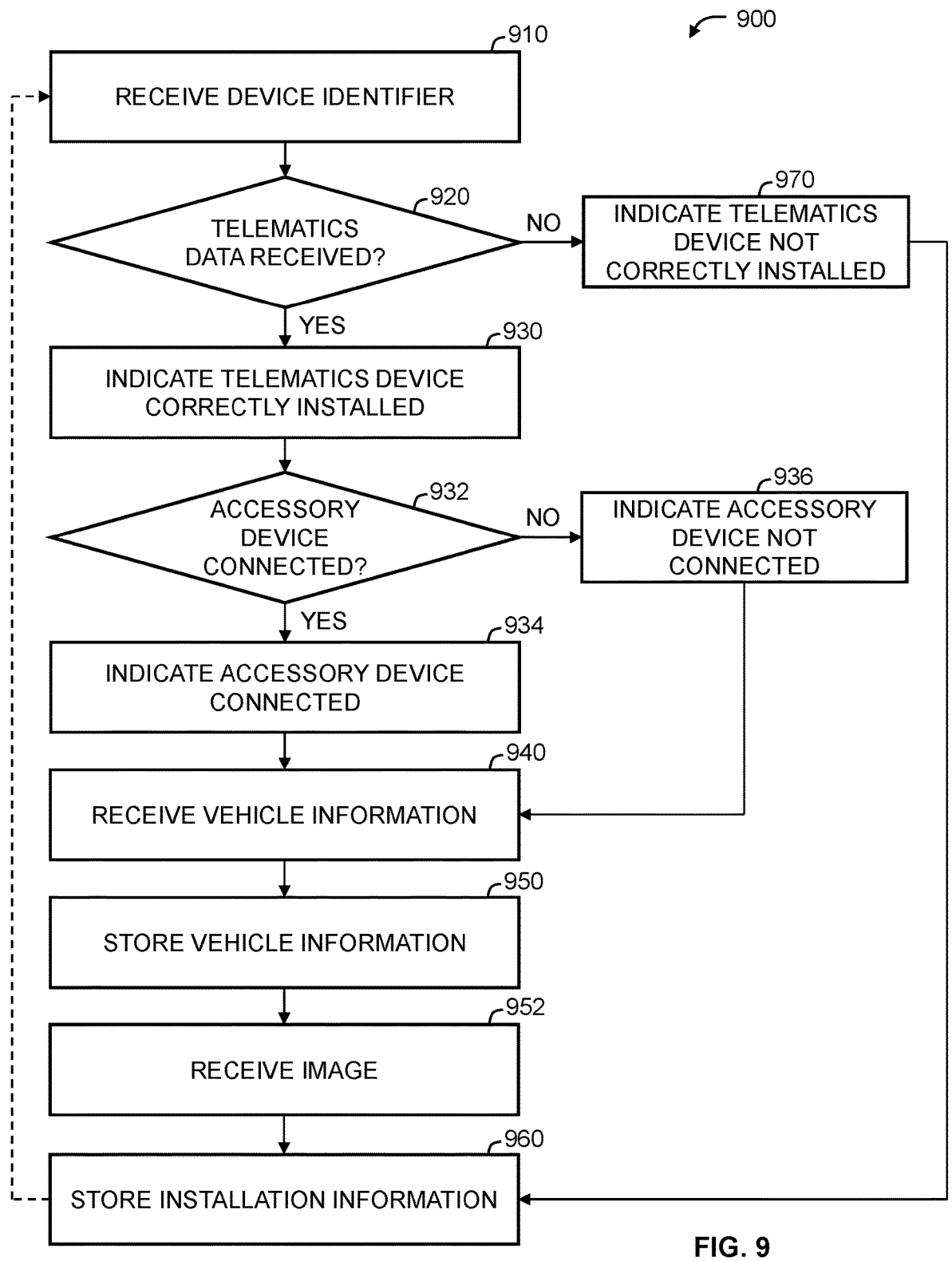
FIG. 9 is a flowchart of another example method for validating telematics device installations, in accordance with an embodiment.

Referring now to FIG. 9, there is shown another example method 900 for validating telematics device installations. Similar to method 500, method 900 can be implemented by the fleet management system 110, one or more computing devices 150, or a combination thereof. That is, method 900 can be implemented by operating at least one processor of the fleet management system 110 and/or one or more computing devices 150.

At 910, a device identifier corresponding to a telematics device 130 can be received. Like at 510, the device identifier can be received from an installer subsequent to an installation of the telematics device 130 in a vehicle 120 by the installer. For example, the installer may input the device identifier into a computing device 150 (e.g., using communication interface 156 and/or display 158). As described herein, the device identifier can be any suitable identifier for identifying the telematics device 130 and can be received in various ways and in various formats.

At 920, it can be determined whether telematics data was received from the telematics device 130. If it is determined that telematics data was received from the telematics device 130, method 900 can proceed to 930. If it is determined that telematics data was not received from the telematics device 130, method 900 can proceed to 970. Like at 520, the determination may involve determining whether telematics data was received from the telematics device 130 in a predetermined time period subsequent to the installation. As described herein, the determination may be made based at least on the device identifier. For example, the computing device 150 (e.g., processor 112) and/or the fleet management system 110 (e.g., processor 112) can determine whether telematics device was received from the telematics device 130.

At 930, an indication that the telematics device 130 was correctly installed in the vehicle 120 can be presented. Like at 530, the indication can be presented in response to determining that telematics data was received from the telematics device 130. As described herein, the indication can generally be any signal that indicates to the installer that the telematics device 130 was correctly installed in the vehicle 120. For example, the indication can be presented at the computing device 150 (e.g., using display 158 and/or communication interface 156) operated by the installer.

At 932, it can be determined whether at least one accessory device 170 is connected to the telematics device 130. If at least one accessory device 170 is connected to the telematics device, method 900 can proceed to 934. If at least one accessory device 170 is not connected to the telematics device, method 900 can proceed to 936. The presence or absence of a connection to the accessory device 170 can indicate whether the accessory device 170 was correctly installed.

It can be determined whether at least one accessory device 170 is connected to the telematics device 130 in a variety of ways. For example, the computing device 150 (e.g., processor 152) and/or the fleet management system 110 (e.g., processor 112) may receive an indication of whether at least one accessory device 170 is connected to the telematics device 130 from the telematics device 130. In some cases, the telematics device 130 (e.g., processor 132) may be able to sense whether at least one accessory device 170 is connected to the telematics device 130. Alternatively, or additionally, the computing device 150 (e.g., processor 152) and/or the fleet management system 110 (e.g., processor 112) may determine whether at least one accessory device 170 is connected to the telematics device 130 based on the telematics data received from the telematics device 130. For instance, the telematics data may contain one or more identifying characteristics associated with data collected from a particular accessory device 170.

It should be appreciated that connection to the accessory device 170 may only be tested if telematics data was received from the telematics device 130 (i.e., if the telematics device 130 was installed correctly). Hence, the connection need not be unnecessarily tested if the telematics device 130 was not correctly installed and is therefore not operational.

At 934, an indication that the at least one accessory device 170 is connected to the telematics device 130 can be presented. The indication can be presented in response to determining that the at least one accessory device 170 is connected to the telematics device 130 at 932. Alternatively, at 936, an indication that the at least one accessory device 170 is not connected to the telematics device 130 can be presented. The indication can be presented in response to in response to determining that the at least one accessory device 170 is not connected to the telematics device 130 at 932.

In either case, the indication can be presented to the installer. For example, the indication can be presented at the computing device 150 (e.g., using display 158 and/or communication interface 156) operated by the installer. The indication can generally be any signal that indicates to the installer whether an accessory device 170 is connected to the telematics device 130. For example, the indication may be an alert, notification, and/or other message presented at the computing device 150. Similar to the indication of whether the telematics device 130 was installed correctly, the indication of whether an accessory device 170 is connected may involve displaying visual elements and/or performing auditory and/or haptic elements.

Figure 10:
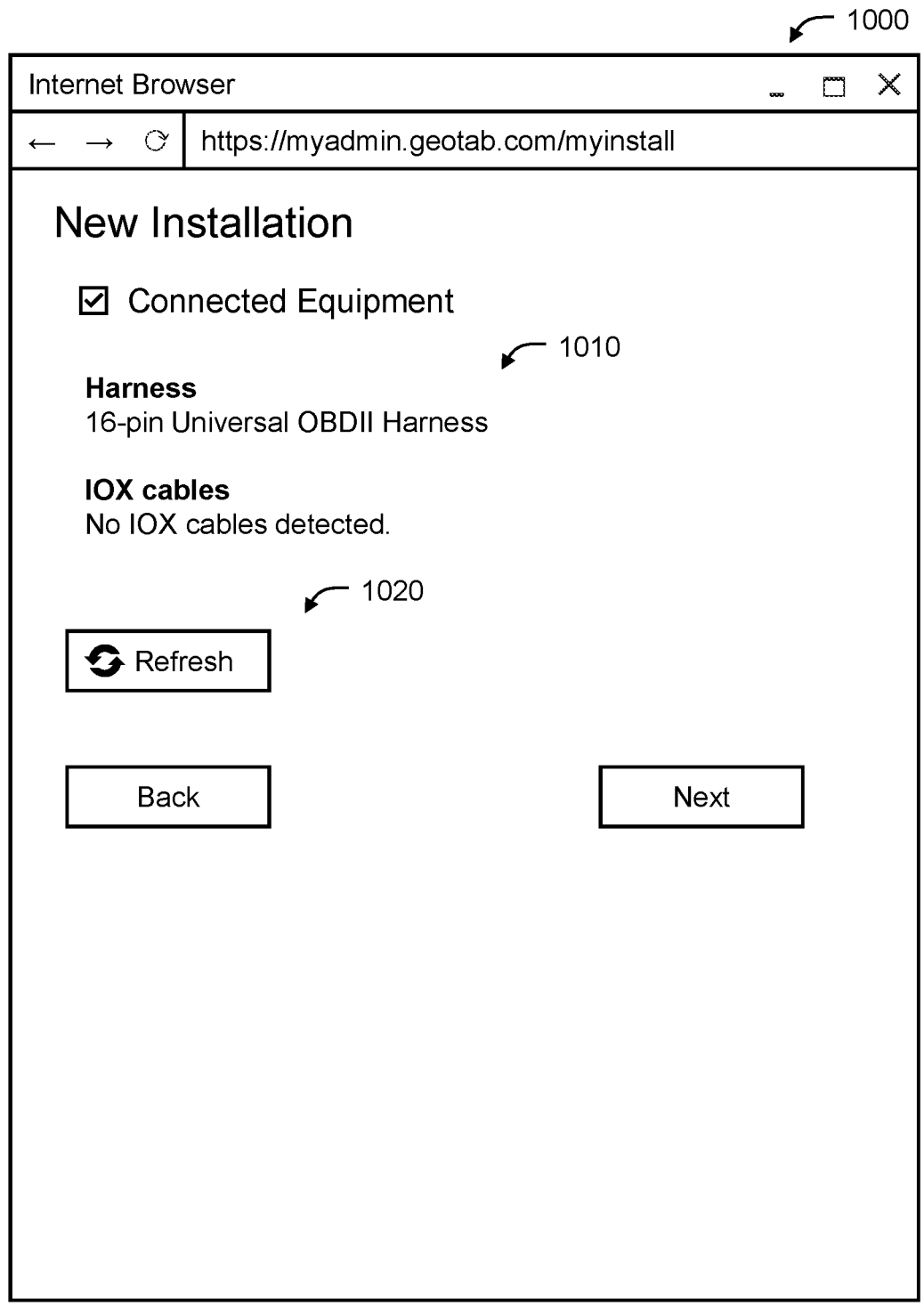
FIG. 10 shows an example user interface for indicating whether an accessory device is connected to a telematics device, in accordance with an embodiment.

Referring to FIG. 10, there is shown an example user interface 1000 for indicating whether at least one accessory device 170 is connected to the telematics device 130. User interface 1000 can be displayed on the computing device 150 (e.g., using display 158) operated by the installer. As shown, user interface 1000 can indicate whether at least one accessory device 170 is connected to the telematics device 130 using one or more graphical elements 1010. In the illustrated example, the graphical element 1010 indicates that a harness is connected to the telematics device 130, but IOX cables are not connected to the telematics device 130. Similar to user interfaces 700A and 700B, the information displayed on the user interface 1000 can be updated in response to the installer selecting the refresh button 1020.

Referring back to FIG. 9, at 940, vehicle information associated with the vehicle 120 can be received. Like at 540, the vehicle information can be received from the installer. For example, the installer can input the vehicle information into the computing device 150 (e.g., using communication interface 156 and/or display 158). As described herein, the vehicle information can generally include any information associated with the vehicle 120 and can be received in various ways and formats.

At 950, the vehicle information can be stored. Like at 550, the vehicle information can be stored in association with the device identifier. For example, the vehicle information can be stored by the fleet management system 110 (e.g., using data storage 114) and/or a computing device 150 (e.g., using data storage 154).

At 952, at least one image can be received. The at least one image can depict the telematics device 130 installed within the vehicle 120. The at least one image can be received from the installer. For example, the installer may capture and upload an image using the computing device 150 (e.g., processor 152). The images can be taken by the installer to prove how the telematics device 130 was installed within the vehicle 120.

Figure 11:
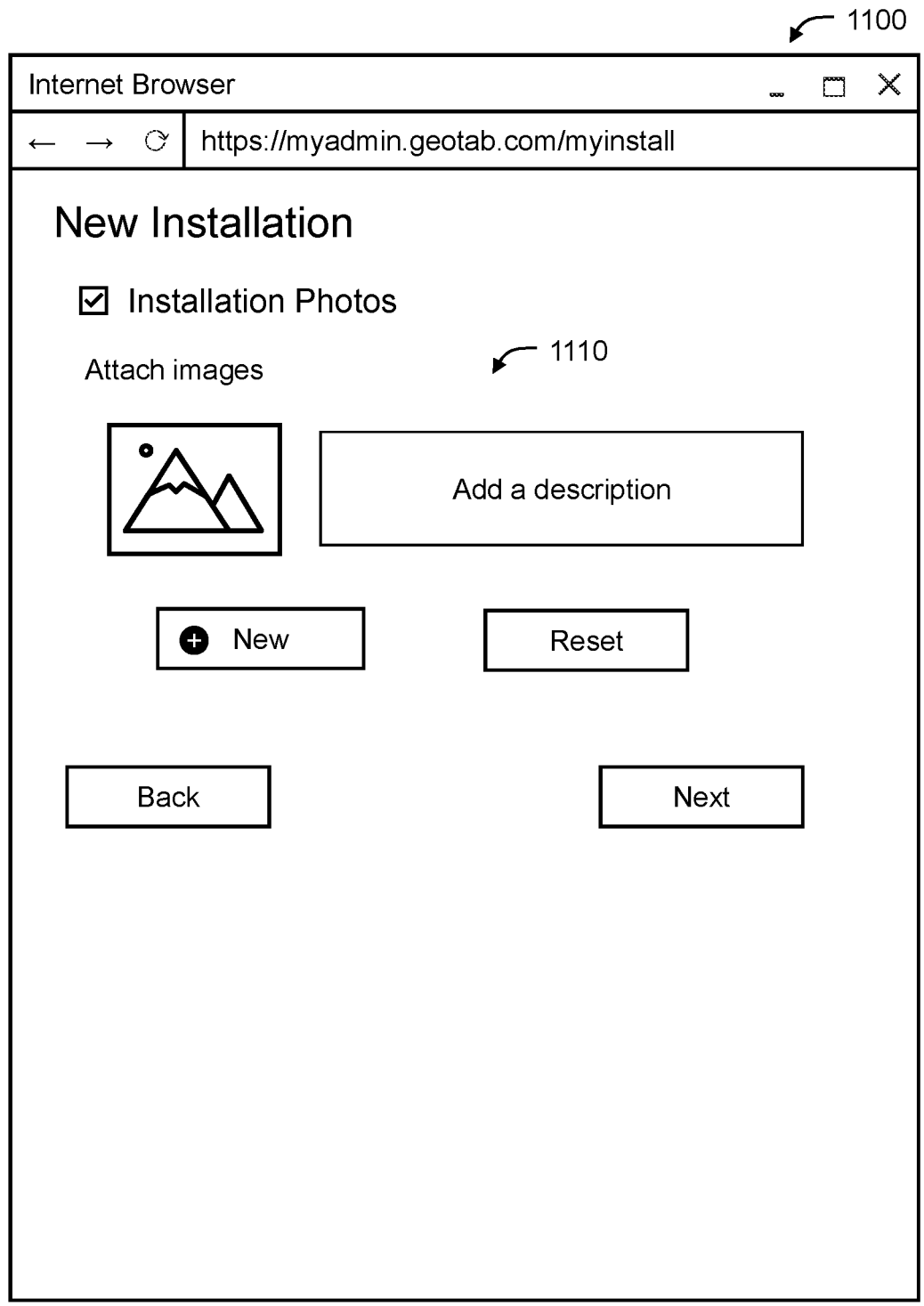
FIG. 11 shows an example user interface for receiving an image of an installed telematics device, in accordance with an embodiment.

Referring now to FIG. 11, there is shown an example user interface 1100 for receiving images of installed telematics devices 130. User interface 1100 can be displayed on the computing device 150 (e.g., using display 158) operated by the installer. As shown, the installer can upload images of the installed telematic device 130 and add accompanying descriptions using various control elements 1110 on the user interface 1100.

Referring back to FIG. 9, at 960, installation information can be stored. Like at 560, the installation information can be stored in association with the device identifier and can indicate whether telematics data was received from the telematics device 130 (i.e., whether the telematics device 130 was installed correctly). However, the installation information can also include other information associated with the installation of the telematics device 130. For example, the installation information may indicate whether at least one accessory device 170 is connected to the telematics device 130 (i.e., whether the at least one accessory device 170 was correctly installed). Additionally, or alternatively, the installation information may include the at least one image depicting the telematics device 130 installed within the vehicle 120. The installation information can be used by a subsequent user to gain insight into any installation performed by an installer, whether successful or unsuccessful. For example, a user can use the installation information to troubleshoot, audit, or investigate successful or unsuccessful installations.

Various embodiments involving other identifiers will now be described. These other identifiers can be received in addition to the device identifier (e.g., at 910 and 510).

In some embodiments, a work order identifier can be received. For example, the installer can input the work order identifier into the computing device 150 (e.g., using communication interface 156 and/or display 158). The work order identifier can correspond to a work associated with the installation of the telematics device (e.g., generated at 420). The work order identifier can be any suitable identifier for identifying the work order and may include numbers, letters, symbols, and/or a combination thereof. The work order identifier can be received in various ways and in various formats, including text, image, and/or audio. The work order identifier can be a unique identifier, for example, when each work order is assigned a work order identifier that uniquely identifies that work order.

Figure 12:
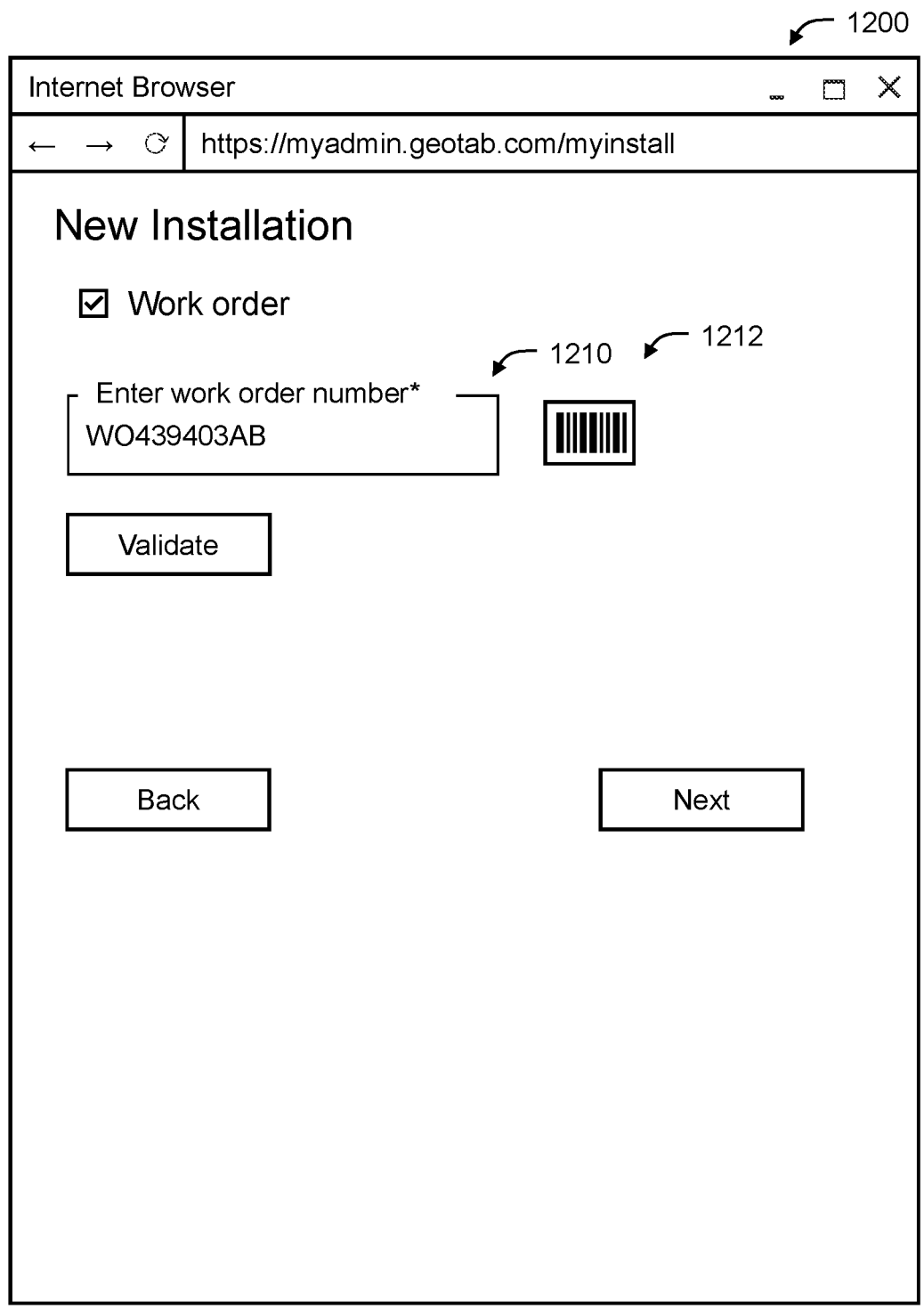
FIG. 12 shows an example user interface for receiving a work order identifier, in accordance with an embodiment.

Referring to FIG. 12, there is shown an example user interface 1200 for receiving a work order identifier. User interface 1200 can be displayed on the computing device 150 (e.g., using display 158) operated by the installer. As shown, in the illustrated example, the installer can provide the work order identifier as text using a text input field 1210. Alternatively, an image of a barcode representing the work order identifier can be captured and decoded by selecting camera button 1212. As shown, the work order identifier can be validated in a similar manner as the device identifier.

The work order identifier can be stored as a part of the installation information (e.g., stored at 960 and 560). In this manner, the installation information can be used to determine whether each telematics device 130 in each work order was correctly installed. This may be useful to determine payment authorization permissions for the installer (e.g., at 460). For example, in some embodiments, it can be determined whether the installation of the telematics device 130 in the vehicle 120 was completed based at least on the installation information. If it is determined that the installation was completed, the installer can be permitted to submit a payment request for the installation. However, if it is determined that the installation was not completed, the installer may not be permitted to submit a payment request for the installation. These determinations and permissions can be executed by the computing device 150 (e.g., processor 152) and/or the fleet management system 110 (e.g., processor 112).

In some embodiments, the telematics device 130 can be a first telematics device 130 and the device identifier can be a first device identifier corresponding to the first telematics device 130. A second device identifier corresponding to a second telematics device 130 can be received. For example, the installer can input the second identifier into the computing device 150 (e.g., using communication interface 156 and/or display 158). The second telematics device 130 can have been removed from the vehicle 120 during the installation the first telematics device 130. In other words, the installation of the first telematics device 130 can involve swapping the second telematics device 130 for the first telematics device 130. The second device identifier can be stored as a part of the installation information (e.g., stored at 960 and 560). In this manner, the identity of the removed telematics device 130 can be stored. Similar to the first device identifier, the second device identifier can be any suitable identifier for identifying the second telematics device 130 and can be received from the installer in various ways and in various formats.

Figure 13:
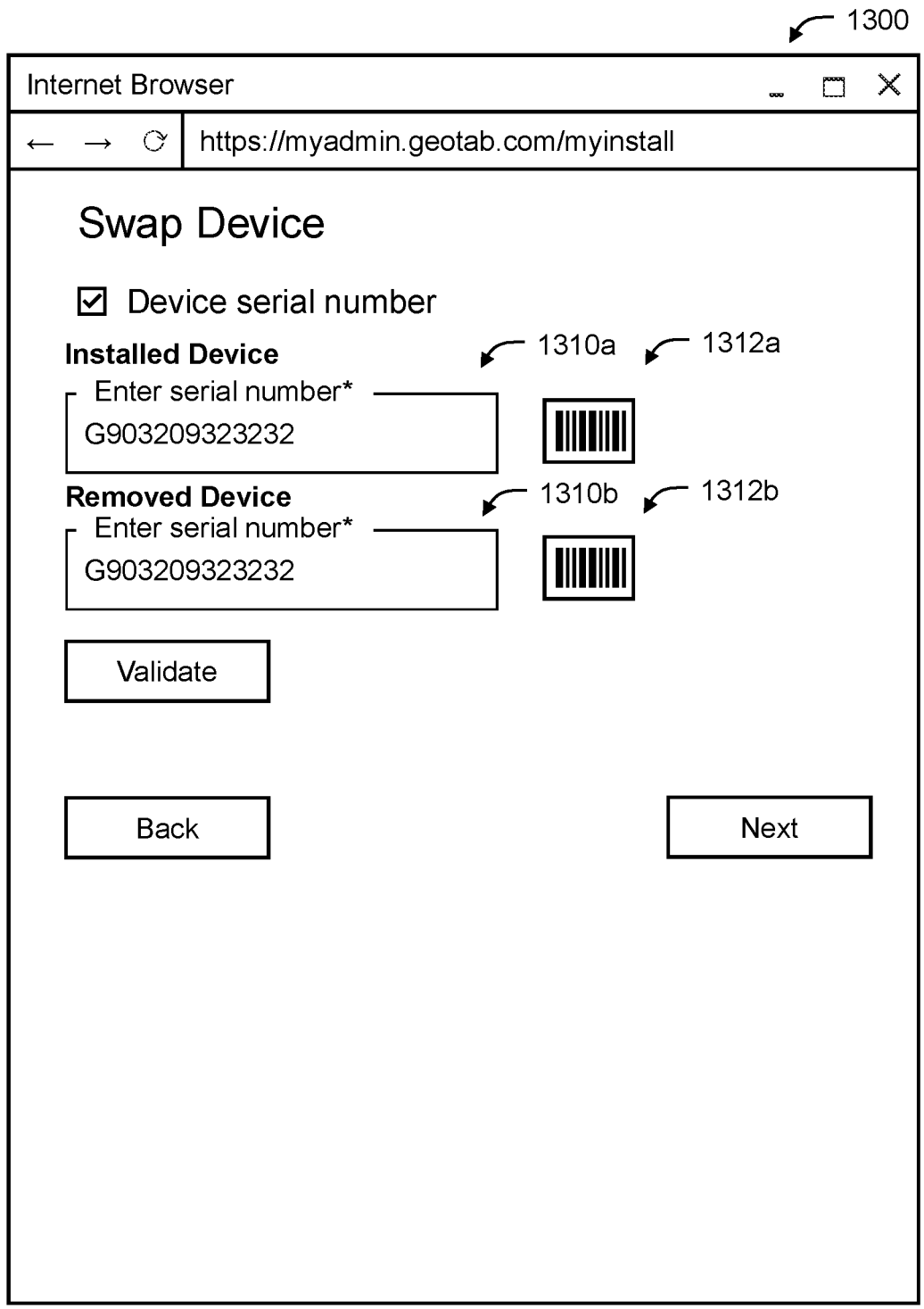
FIG. 13 shows another example user interface for receiving a device identifier, in accordance with an embodiment.

Referring to FIG. 13, there is shown an example user interface 1300 for receiving a first and second device identifier. User interface 1300 can be displayed on a computing device 150 (e.g., using display 158) operated by the installer. As shown, in the illustrated example, the installer may provide the first and second device identifiers as text using text input fields 1310*a*, 1310*b*. Alternatively, an image of a barcode representing the first and second device identifiers can be captured and decoded by selecting camera button 1312*a*, 1312*b*. As shown, the second device identifier may also be validated.

In some embodiments, a service type can be received. For example, the installer can input the service type into the computing device 150 (e.g., using communication interface 156 and/or display 158). The service type can indicate the type of installation service performed by the installer. For example, the service type may indicate whether the installation involved adding a new telematics device 130 to the vehicle 120, replacing an existing telematics device 130 in the vehicle 130, or repairing an existing telematics device 130 in the vehicle 120. The service type can be received in various ways and in various formats, including text, image, and/or audio. The service type can be stored as a part of the installation information (e.g., stored at 960 and 560). In this manner, the installation information can be used to determine the type of installation performed.

Figure 14:
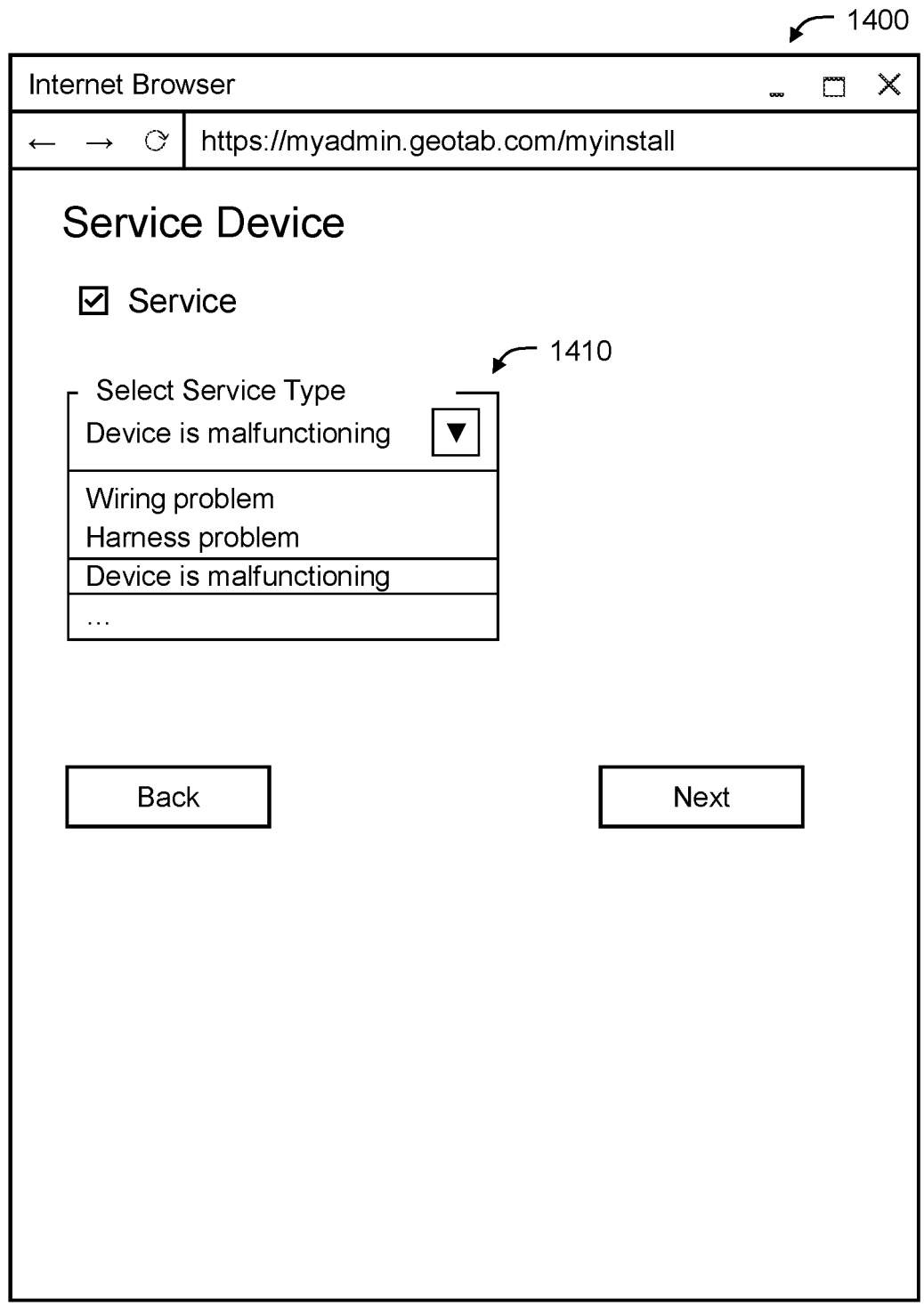
FIG. 14 shows an example user interface for receiving a service type, in accordance with an embodiment.

Referring to FIG. 14, there is shown an example user interface 1400 for receiving a service type. User interface 1400 can be displayed on the computing device 150 (e.g., using display 158) operated by the installer. As shown, in the illustrated example, the installer may select the service type using pull-down menu 1310.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device. Furthermore, the term "coupled" may indicate that two elements can be directly coupled to one another or coupled to one another through one or more intermediate elements.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Furthermore, any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). Programmable hardware such as FPGA can also be used as standalone or in combination with other devices. These devices may also have at least one input device (e.g., a pushbutton keyboard, mouse, a touchscreen, and the like), and at least one output device (e.g., a display screen, a printer, a wireless radio, and the like) depending on the nature of the device. The devices may also have at least one communication device (e.g., a network interface).

It should also be noted that there may be some elements that are used to implement at least part of one of the embodiments described herein that may be implemented via software that is written in a high-level computer programming language such as object-oriented programming. Accordingly, the program code may be written in C, C++ or any other suitable programming language and may comprise modules or classes, as is known to those skilled in object-oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

The invention claimed is:

1. A system for validating telematics device installations, the system comprising:
   at least one data storage operable to store telematics data collected from a telematics device installed in a vehicle; and
   at least one processor in communication with the at least one data storage, the at least one processor operable to:
      subsequent to an installation of the telematics device in the vehicle by an installer, receive a device identifier corresponding to the telematics device;
      determine whether telematics data was received from the telematics device in a predetermined time period subsequent to the installation based at least on the device identifier;
      in response to determining that telematics data was received from the telematics device in the predetermined time period:
         present an indication to the installer that the telematics device was correctly installed in the vehicle;
         determine whether at least one accessory device is connected to the telematics device; and
         present an indication to the installer of whether the at least one accessory device is connected to the telematics device; and
      in response to determining that telematics data was not received from the telematics device in the predetermined time period:
         present an indication to the installer that the telematics device was not correctly installed in the vehicle.

2. The system of claim 1, wherein determining whether the at least one accessory device is connected to the telematics device comprises receiving an indication whether the at least one accessory device is connected to the telematics device from the telematics device.

3. The system of claim 1, wherein the at least one processor is further operable to:
   in response to determining that telematics data was received from the telematics device in the predetermined time period:
      receive vehicle information associated with the vehicle; and
      store the vehicle information in association with the device identifier.

4. The system of claim 1, wherein the at least one processor is further operable to:
   in response to determining that telematics data was received from the telematics device in the predetermined time period:
      receive at least one image depicting the telematics device installed within the vehicle; and
      store the at least one image in association with the device identifier.

5. The system of claim 1, wherein the at least one processor is further operable to:
   prior to the installation of the telematics device in the vehicle by the installer, receive a purchase order for at least one installation of at least one telematics device, the at least one telematics device comprising the telematics device; and
   generate a work order for the at least one installation that is assignable to the installer.

6. The system of claim 1, wherein the at least one processor is further operable to:
   receive a work order identifier corresponding to a work order associated with the installation of the telematics device; and
   store the work order identifier in association with the device identifier.

7. The system of claim 6, wherein the at least one processor is further operable to:
   store installation information in association with the device identifier, the installation information indicating at least whether telematics data was received from the telematics device in the predetermined time period;
   determine whether the installation was completed based at least on the installation information;
   in response to determining that the installation was completed, permit the installer to submit a payment request for the installation; and
   in response to determining that the installation was not completed, do not permit the installer to submit a payment request for the installation.

8. The system of claim 1, wherein the at least one processor is further operable to:
   receive a second device identifier corresponding to a second telematics device, the second telematics device having been removed from the vehicle during the installation of the telematics device;
   store the second device identifier in association with the device identifier.

9. The system of claim 1, wherein the telematics data comprises engine data collected from the vehicle.

10. The system of claim 1, wherein the at least one processor is remotely located from the telematics device and the vehicle.

11. A method for validating telematics device installations, the method comprising operating at least one processor to:
   subsequent to an installation of a telematics device in a vehicle by an installer, receive a device identifier corresponding to the telematics device;
   determine whether telematics data was received from the telematics device in a predetermined time period subsequent to the installation based at least on the device identifier;
   in response to determining that telematics data was received from the telematics device in the predetermined time period:
      present an indication to the installer that the telematics device was correctly installed in the vehicle;

determine whether at least one accessory device is connected to the telematics device; and present an indication to the installer of whether the at least one accessory device is connected to the telematics device; and in response to determining that telematics data was not received from the telematics device in the predetermined time period:

present an indication to the installer that the telematics device was not correctly installed in the vehicle.

12. The method of claim 11, wherein determining whether the at least one accessory device is connected to the telematics device comprises receiving an indication whether the at least one accessory device is connected to the telematics device from the telematics device.

13. The method of claim 11, further comprising operating the at least one processor to:

in response to determining that telematics data was received from the telematics device in the predetermined time period:

receive vehicle information associated with the vehicle; and store the vehicle information in association with the device identifier.

14. The method of claim 11, further comprising operating the at least one processor to:

in response to determining that telematics data was received from the telematics device in the predetermined time period:

receive at least one image depicting the telematics device installed within the vehicle; and store the at least one image in association with the device identifier.

15. The method of claim 11, further comprising operating the at least one processor to:

prior to the installation of the telematics device in the vehicle by the installer, receive a purchase order for at least one installation of at least one telematics device, the at least one telematics device comprising the telematics device; and generate a work order for the at least one installation that is assignable to the installer.

16. The method of claim 11, further comprising operating the at least one processor to:

receive a work order identifier corresponding to a work order associated with the installation of the telematics device; and store the work order identifier in association with the device identifier.

17. The method of claim 16, further comprising operating the at least one processor to:

store installation information in association with the device identifier, the installation information indicating at least whether telematics data was received from the telematics device in the predetermined time period;

determine whether the installation was completed based at least on the installation information;

in response to determining that the installation was completed, permit the installer to submit a payment request for the installation; and in response to determining that the installation was not completed, do not permit the installer to submit a payment request for the installation.

18. The method of claim 11, further comprising operating the at least one processor to:

receive a second device identifier corresponding to a second telematics device, the second telematics device having been removed from the vehicle during the installation of the telematics device; and store the second device identifier in association with the device identifier.

19. The method of claim 11, wherein the telematics data comprises engine data collected from the vehicle.

20. A non-transitory computer readable medium having instructions stored thereon executable by at least one processor to implement a method for validating telematics device installations, the method comprising operating the at least one processor to:

subsequent to an installation of a telematics device in a vehicle by an installer, receive a device identifier corresponding to the telematics device;

determine whether telematics data was received from the telematics device in a predetermined time period subsequent to the installation based at least on the device identifier;

in response to determining that telematics data was received from the telematics device in the predetermined time period:

present an indication to the installer that the telematics device was correctly installed in the vehicle;

determine whether at least one accessory device is connected to the telematics device; and present an indication to the installer of whether the at least one accessory device is connected to the telematics device; and in response to determining that telematics data was not received from the telematics device in the predetermined time period:

present an indication to the installer that the telematics device was not correctly installed in the vehicle.

* * * * *